US007489845B2

(12) United States Patent
Ip

(10) Patent No.: US 7,489,845 B2
(45) Date of Patent: Feb. 10, 2009

(54) FIBER OPTIC WITHY LIGHT DEVICE

(76) Inventor: T. Y. Ip, Rm 3-4, 11/F, Cheung Fat Industrial Building, 64-76 Larch Street, Kowloon (HK)

( * ) Notice: Subject to any disclaimer, the term of this patent is extended or adjusted under 35 U.S.C. 154(b) by 0 days.

(21) Appl. No.: 11/801,434

(22) Filed: May 10, 2007

(65) Prior Publication Data

US 2008/0002422 A1 Jan. 3, 2008

Related U.S. Application Data

(63) Continuation-in-part of application No. 11/479,512, filed on Jun. 30, 2006, now abandoned.

(51) Int. Cl.
*G02B 6/04* (2006.01)

(52) U.S. Cl. .................................... 385/115; 385/147

(58) Field of Classification Search ..................... None
See application file for complete search history.

(56) References Cited

U.S. PATENT DOCUMENTS 2,316,589 A * 4/1943 Iwanowicz .................. 362/567
3,532,874 A * 10/1970 Rosenast .................... 362/567
3,641,335 A * 2/1972 Wall ........................... 362/567
3,803,398 A * 4/1974 Walker ......................... 40/433
5,865,533 A * 2/1999 Liu ............................ 362/583
6,361,198 B1 * 3/2002 Reed .......................... 362/554
2005/0052883 A1 * 3/2005 Qi et al. ...................... 362/555
2005/0281519 A1 * 12/2005 Shrout ........................ 385/115

* cited by examiner

*Primary Examiner*—Sung H Pak
(74) *Attorney, Agent, or Firm*—Eric Hanscom; Todd Langford

(57) ABSTRACT

A light device includes a base portion, a light portion having a first plurality of substantially translucent fiber optic elements and a second plurality of substantially translucent fiber optic elements, and a light source located within the base portion. A power supply may be electrically connected to the light source. The light source emits light to the first plurality of substantially translucent fiber optic elements and the second plurality of substantially translucent fiber optic elements. The first plurality of substantially translucent fiber optic elements may have a shorter length than the second plurality of substantially translucent fiber optic elements. The second plurality of substantially translucent fiber optic elements may have a modified tip region for reflecting light from the tip region. The light source may be formed by LEDs or tungsten filament bulbs. A control circuit may cause the light emitted to be constant or flashing.

25 Claims, 5 Drawing Sheets

FIBER OPTIC WITHY LIGHT DEVICE

CROSS REFERENCE TO RELATED APPLICATIONS

This application claims priority benefit from U.S. application Ser. No. 11/479,512, filed Jun. 30, 2006.

PRIORITY

This application is a continuation-in-part of U.S. utility patent application Ser. No. 11/479,512, filed on Jun. 30, 2006, now abandoned the content of which is fully incorporated by reference herein.

STATEMENT REGARDING FEDERALLY SPONSORED RESEARCH OR DEVELOPMENT

This invention was not federally sponsored.

BACKGROUND

The embodiments of the invention generally relate to the field of decorative lights. More specifically, the embodiments of the invention relate to a fiber optic withy light device for both indoor and outdoor use.

Since the invention of the light bulb, people have attempted to find new and unique ways to create festive atmospheres, both indoor and outdoor, through the use of lighting. For example, decorative lights have been placed on top of furniture, in ceilings, on walls, in rooms, and in several other locations within the home. Lights have also been placed next to walkways and hung from patio covers and gazebos to provide a more festive outdoor setting.

Current decorative lights are generally constructed with plain bulbs and simple lampshades. These lights, while providing great functional aspects, often lack in originality of construction and in light source. Also, prior art lighting devices have not offered the ability to quickly and efficiently configure the device to emit directed light in various specific directions.

Therefore, there is a current need for a decorative lighting device that may provide a festive indoor and outdoor atmosphere that is convenient to use, may be configured to direct light in several directions, is aesthetically pleasing, and utilizes new and improved lighting techniques.

In this respect, before explaining at least one embodiment of the invention in detail it is to be understood that the embodiments of the invention are not limited in their application to the details of construction and to the arrangement of the components set forth in the following description or illustrated in the drawings. The embodiments of the invention are capable of being practiced and carried out in various ways. In addition, it is to be understood that the phraseology and terminology employed herein are for the purpose of description and should not be regarded as limiting.

BRIEF SUMMARY OF SOME EMBODIMENTS

One embodiment of the invention provides a fiber optic withy light device comprised of a base portion, a light portion having a first plurality of substantially translucent fiber optic elements and a second plurality of substantially translucent fiber optic elements, a light source located within the base portion, and a power supply electrically connected to the light source. The light source emits light to the first plurality of substantially translucent fiber optic elements and the second plurality of substantially translucent fiber optic elements. The first plurality of substantially translucent fiber optic elements may have a shorter length than the second plurality of substantially translucent fiber optic elements. The first plurality of substantially translucent fiber optic elements may provide support for the second plurality of substantially translucent fiber optic elements. The second plurality of substantially translucent fiber optic elements may have a modified tip region for reflecting light from the tip region. The modified tip region may comprise a tip region with at least a portion of the substantially translucent fiber optic element shaved to maximize light reflection from the tip region. The light source may be formed by LEDs or tungsten filament bulbs.

In another embodiment, the fiber optic withy light device may include a flashing control circuit connected between the power supply system and the light source system. The flashing control circuit controls the light spots emitted by the fiber optics elements. The flashing control circuit may automatically be set to cause the light to flash in various preset flashing patterns or remain constant. The flashing control circuit may also be manually set to allow the operator to modify the timing of the flashing. The flashing control circuit may also be automatically set, or may also be user programmed, to flash one color of light for a set period and other colors of light for other periods of time.

Another embodiment of the invention provides a fiber optic withy light device comprised of a base portion, a light portion having a first plurality of substantially translucent fiber optic elements, a second plurality of substantially translucent fiber optic elements, and a third plurality of substantially translucent fiber optic elements, a light source located within the base portion, and a power supply electrically connected to the light source. The light source emits light to the first plurality of substantially translucent fiber optic elements and the second plurality of substantially translucent fiber optic elements. The third plurality of substantially translucent fiber optic elements may have a different length than the first plurality of substantially translucent fiber optic elements and the second plurality of substantially translucent fiber optic elements. The second plurality of substantially translucent fiber optic elements may provide support for the third plurality of substantially translucent fiber optic elements. The second and third plurality of substantially translucent fiber optic elements may have a modified tip region for reflecting light from the tip region. The modified tip region may comprise a tip region with at least a portion of the substantially translucent fiber optic element shaved, scratched, chemically etched, mechanically flattened, or modified in some other manner to maximize light reflection from the tip region and/or to create a specific design from which the light is refracted and emitted to provide an illuminated shape. The light source may be formed by LEDs or tungsten filament bulbs.

There has thus been outlined the features of some embodiments of the invention in order that the detailed description thereof may be better understood, and in order that the present contribution to the art may be better appreciated. There are additional features of the embodiments of the invention that will be described hereinafter and which will form the subject matter of the claims appended hereto.

BRIEF DESCRIPTION OF THE DRAWINGS

The accompanying drawings, which are incorporated in and form a part of this specification, illustrate embodiments of the invention and together with the description, serve to explain the principals of the embodiments of the invention.

DETAILED DESCRIPTION OF SOME EMBODIMENTS

Figure 1:
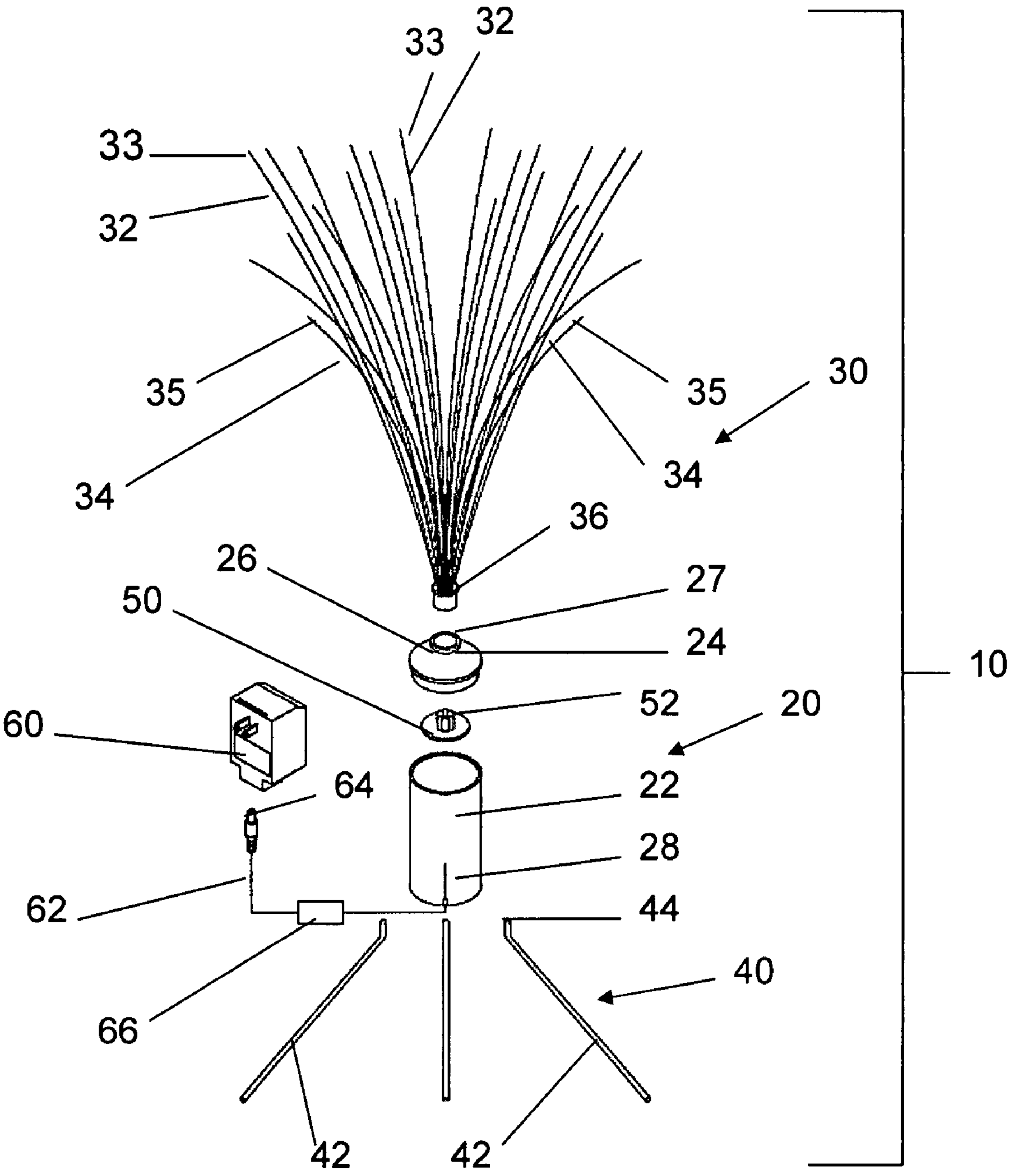
FIG. 1 shows a front exploded view of an embodiment of the fiber optic withy light device.

Referring now to the drawings, wherein similar parts are identified by like reference numerals, FIG. 1 shows a front exploded view of an embodiment of the fiber optic withy light device 10. Device 10 includes a base portion 20, a light portion 30, a support portion 40, and power transmission means 60. Base portion 20 includes a base 22 that is preferably cylindrical in shape and contains a removable top section 24. However, base 22 may also comprise various shapes such as spherical, rectangular, circular, trapezoidal, hexagonal, octagonal, triangular, square, polygonal, or other shapes as would be recognized by one with ordinary skill in the art. Top section 24 may contain a raised lip 26 bounding a centrally-located opening 27. Raised lip 26 may vary in height to providing an opening 27 that may support a light portion 30 of various sizes. Opening 27 is preferably circular in shape, but may also be other shapes to secure light portions 30 of various cross-section shapes.

Light portion 30 may be comprised of a plurality of long fiber optic elements 32 and a plurality of short fiber optic elements 34. Fiber optic elements 32 and 34 may be comprised of translucent tube having a fiber optic cable therein (not shown). In some embodiments, the tube may be substantially translucent. In one embodiment, fiber optic elements 32 and 34 may also be comprised of a translucent tube having more than one fiber optic cable positioned therein, surrounding a wire also located within the tube, whereby a user may bend the wire to cause the tube to be oriented in a particular position. The tube may be any type of translucent and deformable material, such as plastic. The wire may be any type of wire that is flexible, durable, and does not interfere with the light transmission within the fiber optic cable. The fiber optic cables may be all the same length or different lengths to achieve differing light emissions. In another implementation, fiber optic elements 32 and 34 may also have more than one support structure therein to provide more flexibility and stability.

Short fiber optic elements 34 may be dispersed in any arrangement around and/or within long fiber optic elements 32. In one implementation, short fiber optic elements 34 are positioned to surround long fiber optic elements 34 to assist in supporting long fiber optic elements 34 in a substantially upright position. Short fiber optic elements 34 may be of any length that is shorter than long fiber optic elements 32. Long fiber optic elements 32 may be of any length that is longer than short fiber optic elements 34. Light portion 30 may contain any number of long fiber optic elements 32 and any number of short fiber optic elements 34. In one embodiment, fiber optic elements 32 and 34 are lightweight, flexible, and bendable such that they can be easily swayed by minimal air movement. Each of long fiber optic elements 32 may contain a tip region 33 and each of short fiber optic elements 34 may contain a tip region 35. Tip regions 33 and 35 may be modified to allow light to reflect from light from tip regions 33 and 35 in a particular direction (see FIGS. 6A-6F).

In some embodiments, light portion 30 may include a third plurality of fiber optic elements (now shown) that each have a different length than fiber optic elements 32 and 34. Still further, in certain embodiments the length of the length of fiber optic elements 32 and 34 and the length of the third plurality of fiber optic elements may be proportional to the length of light portion 30. For example, if light portion 30 includes fiber optic elements having three different lengths, each fiber optic element may be grouped according to length, with one group having a length of one-third of the size of the length of the longest group, one group having a length of two-thirds of the size of the length of the longest group, and one group having the longest length of fiber optic elements.

Support portion 40 is connected to base portion 20. In one embodiment, support portion 40 may be connected to base 22. Support portion 40 may be comprised of one or more support members 42. Support members 42 may be coupled to base 22. As an example, support members 42 may be shaped as a rod having an angled end region, wherein the angled end region can slide into a grove 28 located on base 22. In other embodiments, support portion 40 may comprise a one support member or a plurality of support members. Support members 42 may be comprised of metallic or polymer-based materials.

Device 10 may also include a light source 50. Light source 50 may transfer light to fiber optic elements 32 and 34. In one embodiment, light source 50 is contained within base portion 20. Light source 50 may contain at least one LED 52 disposed thereon. In some implementations, light source 50 contains a plurality of LEDs 52 disposed thereon. LEDs 52 may comprise similar types of LEDs that may emit the same color light, or LEDs 52 may comprise a mixture of different LEDs to emit various color lights. LEDs 52 may be various sizes and shapes to achieve the desired lighting and power consumption characteristics. In some embodiments, light source 50 is connected to control circuitry 54 (see FIG. 2) that can control whether or not light is emitted from light source 50. In other embodiments, control circuitry 54 may also control the duration of the light emitted and the color of the light emitted. For example, control circuitry 54 may be programmed to cause light source 50 to emit light in a flashing pattern or may be programmed to cause light source 50 to emit light of one color for a certain time period and then emit light of a different color for another time period.

Power transmission means 60 may comprise an adapter attached to a power cord 62 attached via a plug 64. Power cord 62 may be routed through base 22 and may connect to power supply circuitry (not shown) located within base 22. The power supply circuitry may operate at 1 Watt and at 12 Volts. Power cord 42 may also include a control switch 66 located therein. Control switch 66 may allow a user to turn the device 10 on or off. In other embodiments, control switch 66 may also allow the user to select from different lighting features by sending signals to control circuitry that may change the color and/or duration of the light emitted. For example, a user may choose a steady emission of white light, a flashing emission of green light, or a combination of a steady and flashing light emission of red light, blue light, and yellow light. The user may also choose to set the light to turn on and off at various periods. For example, the user may choose to set the light to turn on for one hour, then off for an hour, then on again for another hour.

In one embodiment, control switch 66 may comprise a box with a wheel device mounted substantially therein, whereby a user rotates the wheel until the wheel "clicks", causing the device to change modes. Control switch 66 may also comprise a button, wherein multiple pushes of the button may cause the device to changes modes. Control switch 66 may also be comprised of other switching mechanisms as would be recognized by one with ordinary skill in the art.

Figure 2:
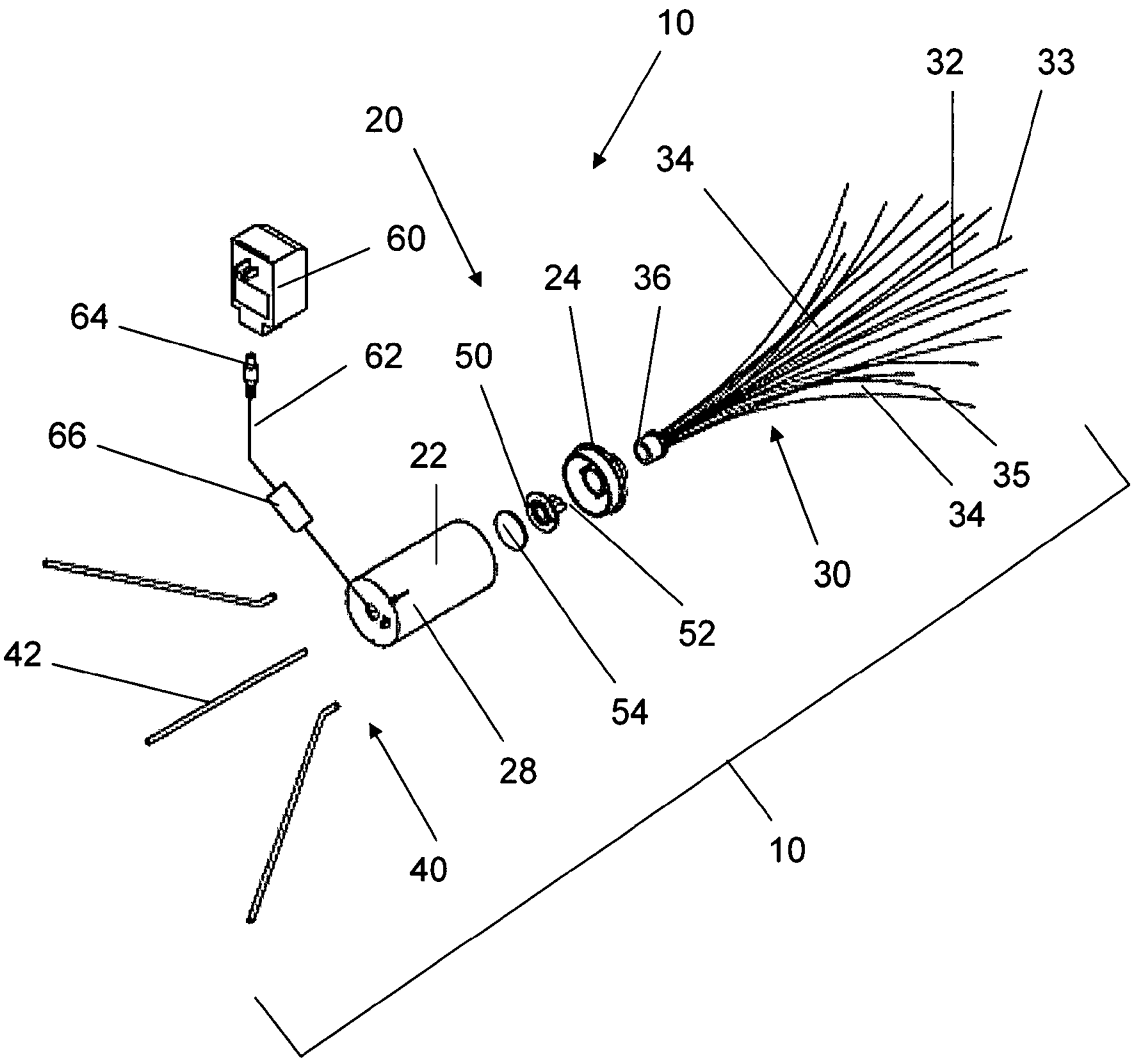
FIG. 2 shows a side exploded view of an embodiment of the fiber optic withy light device.

FIG. 2 shows a side perspective exploded view of device 10, illustrating the connectivity of base portion 20, light portion 30, support portion 40, and power transmission means 60. Shown in this figure is the attachment of power cord 62 to base 22. Also shown is the location of control circuit 54 switch 29 coupled to base 22. Switch 22 may be used to control one or more electrical aspects of device 10. As an example, switch 22 may be used to control the pattern of light emitted from light source 50 to produce various light effects.

Figure 3:
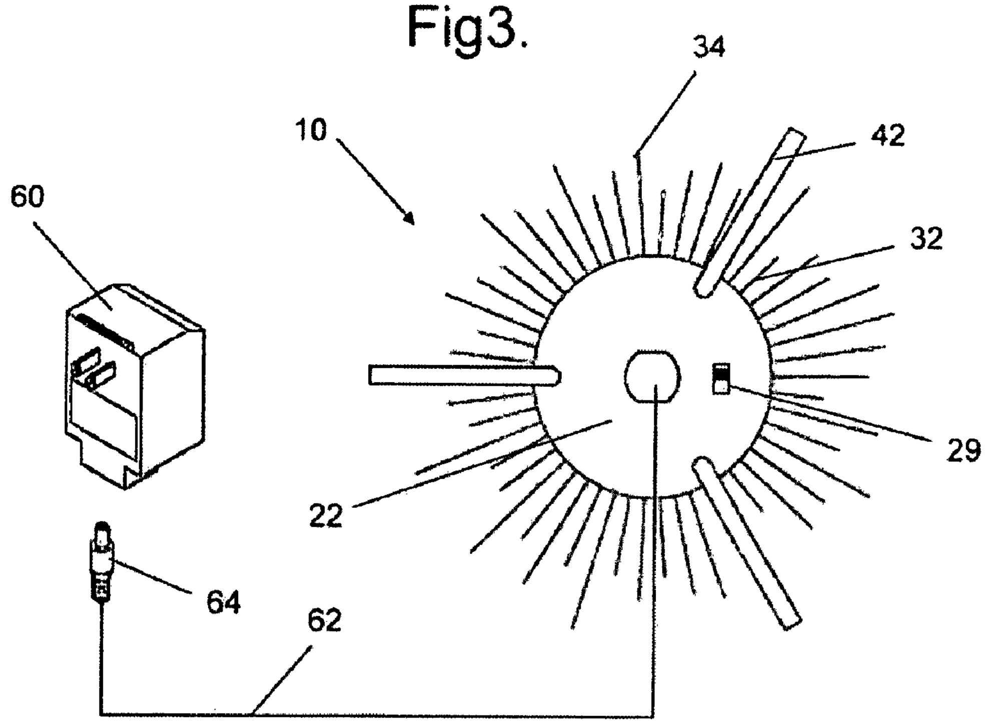
FIG. 3 shows a bottom view of an embodiment of the fiber optic withy light device.
Figure 4:
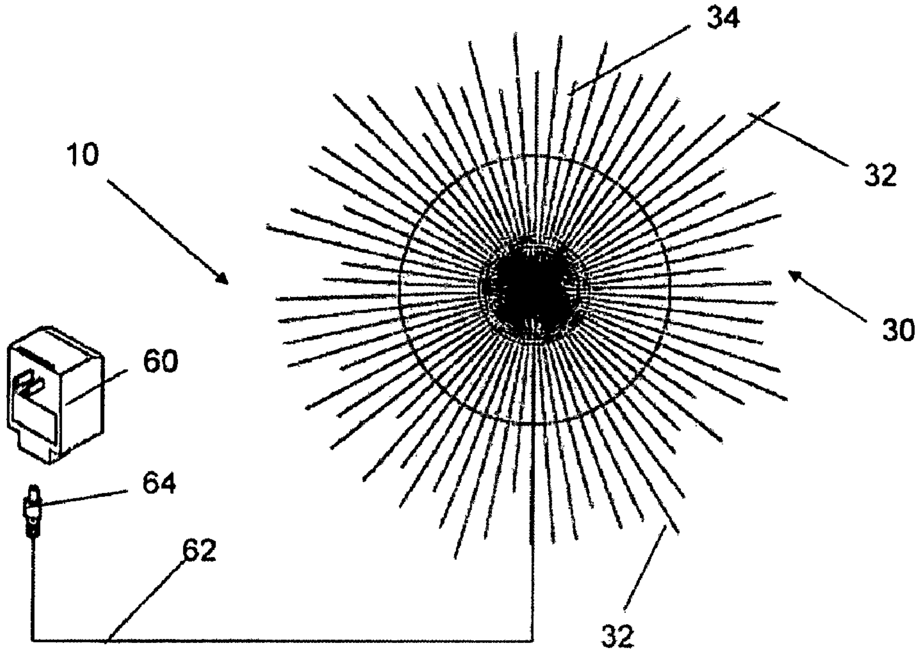
FIG. 4 shows a top view of an embodiment of the fiber optic withy light device.

Referring now to FIG. 3 and FIG. 4, FIG. 3 shows a bottom view of device 10 with power transmission means 60 coupled thereto, illustrating the location of base 22 in relation to fiber optic elements 32 and 34. Also shown in this figure is one placement of switch 29 on base 22. FIG. 4 shows a top view of device 10 with power transmission means 60 coupled thereto, illustrating one spatial arrangement of long fiber optics 32 in relation to shot fiber optics 34.

Figure 5:
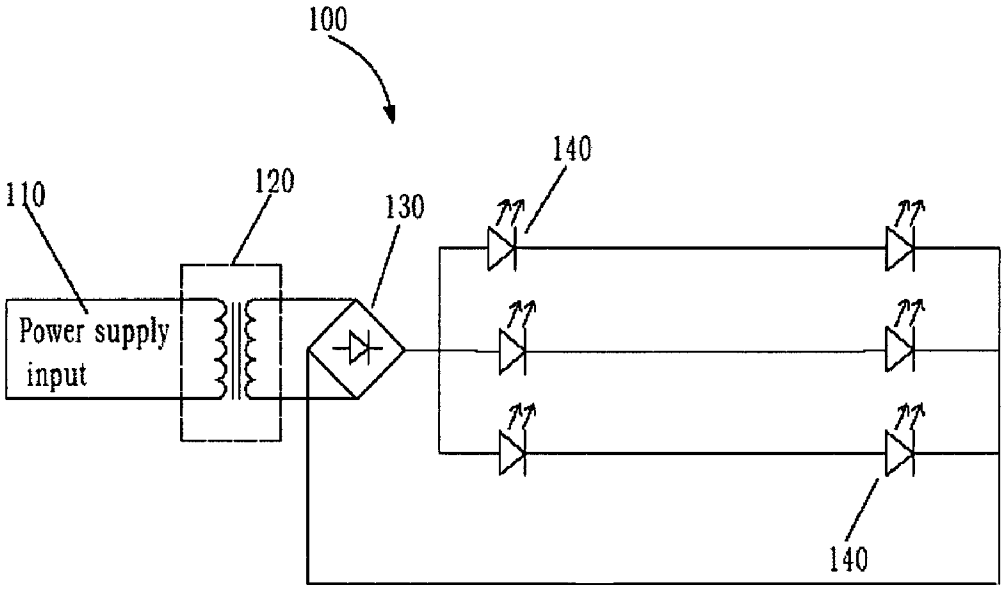
FIG. 5 shows a schematic of the electric circuitry contained within an embodiment of the fiber optic withy light device.

FIG. 5 shows a schematic of the electric circuitry 100 contained within an embodiment of the fiber optic withy light set. Electric circuitry 100 may include a power supply input 110 feeding a transformer 120 that may be connected to a bridge rectifier 130. Bridge rectifier 130 may be connected to a plurality of diodes 140 that may be connected in parallel. Diodes 140 may comprise light emitting diodes, but may be other diodes as recognized by one with ordinary skill in the art. Further, each of diodes 140 may emit different wavelengths to produce various colors of light, or each of diodes 140 may emit the same wavelength to produce the same color of light.

Figure 6:
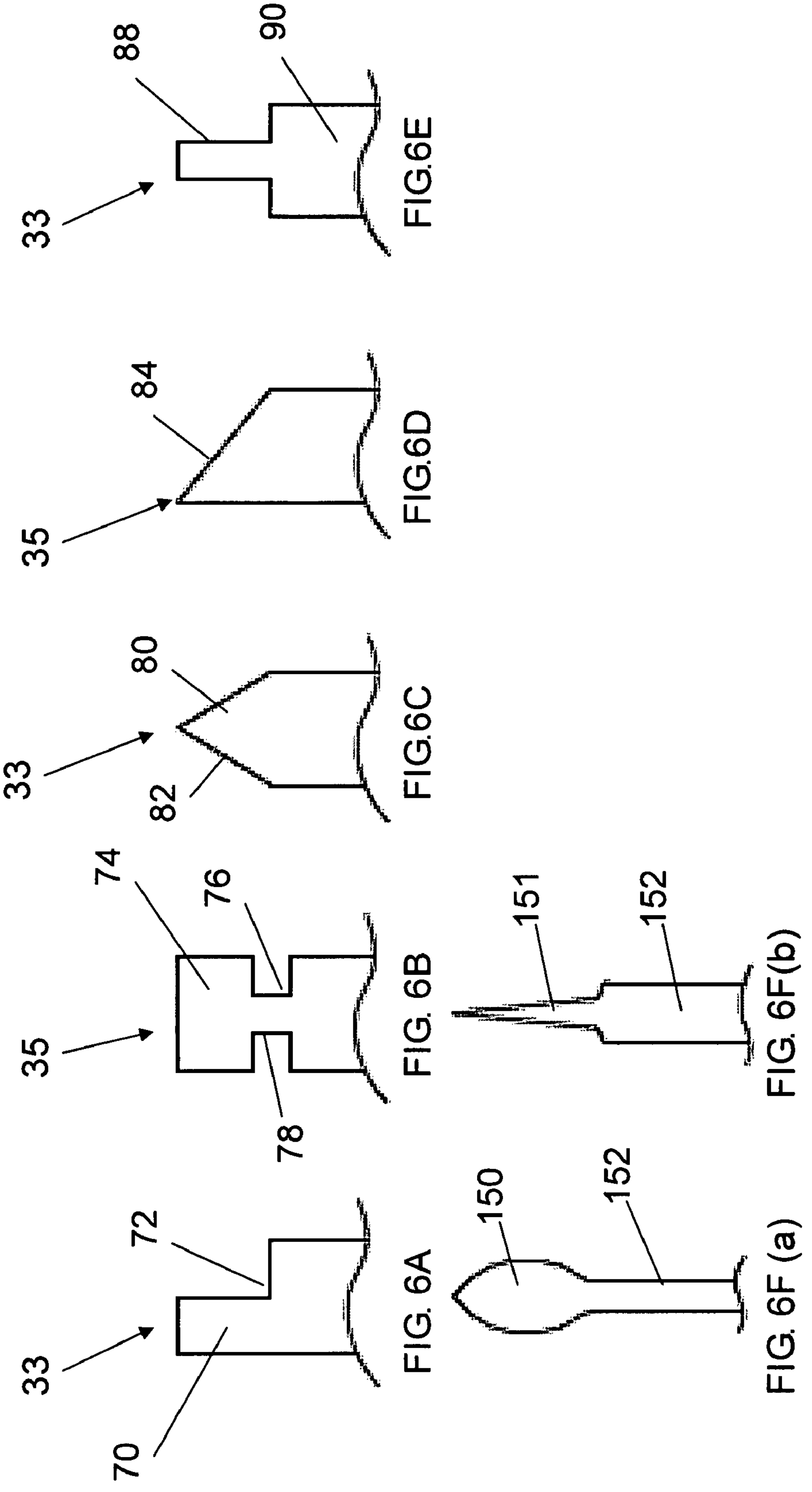
FIGS. 6A-6F show various embodiments of modified tip regions of fiber optic elements in accordance with some embodiments of the fiber optic withy light device.

Referring now to FIGS. 6A-6F, there are shown various embodiments of tip regions 33 and 35. Although each figure is described with reference to either tip region 33 or tip region 35, the different embodiments shown in FIGS. 6A-6F may each apply to either tip region 33 and/or tip region 35. Further, the modifications of the tip regions of fiber optics 32 and 34 as shown in FIGS. 6A-6F are illustrative and not exhaustive of the types of modifications that can be performed on tip regions 33 and 35 to alter light reflection from tip regions 33 and 35, or to create a lit "shape", where the shape is created through mechanical manipulation of the terminal end of the fiber optic cable. FIG. 6A shows a tip region 33 having an extension region 70 formed from a groove 72 in tip region 33. Light may emit from the tip of extension region 70 and/or the edges of groove 72. FIG. 6B shows a tip region 35 having an upper region 74 and two grooves 76 and 78 formed therein. Light may emit from the tip of upper region 74 and/or grooves 76 and 78. FIG. 6C shows a tip region 33 having a pointed end caused by the intersection of slanted regions 80 and 82. Light may be emitted from slanted regions 80 and 82. FIG. 6D shows a tip region 35 having a slanted top surface 84, from which light can be emitted. FIG. 6E shows a tip region 33 having a centrally located extension region 88 extending from a lower tip portion 90. Light may be emitted from the tip or sides of extension region 88 and/or from the top surface of lower tip portion 90. Tip regions 33 and 35 may be modified by various methods including by slicing, clipping, crimping, sanding, or any other method as recognized in the art.

FIG. 6F shows an alternative iteration of the invention in which the tip region has been mechanically pressed to create a desire shape (in this case a spade as illustrated by 150 in FIG. 6F(a)), resulting in a thinning of the tip region (as illustrated by 151 in FIG. 6F(b)), such that the flattened section of the fiber optic cable (150 and 151) is substantially thinner that the base portion 152 of the fiber optic cable. Once the desired shaped has been created, the surface of the shape can be scratched, sanded, scoured, chemically etched, or modified by some other known process to refract and/or deflect the light rays so as to illuminate the entire shape.

With respect to the above description it is to be realized that the optimum dimensional relationships for the parts of the invention, including variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents fall within the scope of the present invention.

The above description, together with the advantages of the invention and the various features of novelty which characterize the invention, are pointed out with particularity in the claims annexed to and forming a part of this disclosure. For a better understanding of the invention, its operating advantages and the specific advantages attained by its uses, reference should be made to the accompanying drawings and descriptive matter in which there are illustrated preferred embodiments of the invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting, as to the scope of the invention in any way.

What is claimed is:

1. A fiber optic light device comprising:

a base portion, where the base portion is cylindrical in shape, a light portion, where the light portion is attached to the base portion, where the light portion comprises a plurality of fiber optics, where the plurality of fiber optics comprise a plurality of short fiber optics and a plurality of long fiber optics, where the plurality of short fiber optics surround the plurality of long fiber optics, where the short fiber optics provide lateral support to the plurality of long fiber optics, where the plurality of short fiber optics are shorter than the plurality of long fiber optics, where the short fiber optics are the only means of lateral support for the plurality of long fiber optics, a light source, where the light source comprises an LED, where the LED emits light when powered, where the LED transfers light to the plurality of fiber optics when the LED emits light, a support portion, where the support portion is connected to the base portion, where the support portion comprises a plurality of members, where the support portion supports the fiber optic light device, and a means for power transmission, where the means for power transmission comprises an adapter and a power cord, where the adapter is connected to the fiber optic light by the power cord, where each of the plurality of fiber optics has two ends, where one end is proximate to the light source, and where the other end has a tip region that has been modified, where the modified tip region comprises a groove located therein.

2. The fiber optic light of claim 1, further comprising a top section, where the top section comprises an opening with a raised lip, where the opening with a raise lip provides an opening that supports the light portion.

3. The fiber optic light of claim 2, where the opening is circular in shape.

4. The fiber optic light of claim 1, where the plurality of fiber optics comprises a plurality of longer fiber optics, where the plurality of longer fiber optics are longer than the plurality of short fiber optics and the plurality of long fiber optics, where the plurality of longer fiber optics are laterally supported by the plurality of long fiber optics.

5. The fiber optic light of claim 1, where the light source further comprises an additional LED.

6. The fiber optic light of claim 5, where the additional LED emits a light that is a different color than the light emitted by the LED.

7. The fiber optic light of claim 1, further comprising a control circuit.

8. The fiber optic light of claim 7, where the control circuit can control the duration of the light emitted from the light source.

9. The fiber optic light of claim 6, further comprising a control circuit, where the control circuit can control the color of the light emitted from the light source.

10. The fiber optic light of claim 1, further comprising a control switch, where the control switch enables a user to turn the light source on or off.

11. The fiber optic light of claim 10, where the control switch comprises a box and a wheel device mounted substantially therein, where the user turns the light source on or off by rotating the wheel.

12. The fiber optic light of claim 10, where the control switch comprises a button, where the user turns the light source on or off by pushing the button.

13. A fiber optic light device comprising:

a base portion, where the base portion is cylindrical in shape, a light portion, where the light portion is attached to the base portion, where the light portion comprises a plurality of fiber optics, where the plurality of fiber optics comprise a plurality of short fiber optics and a plurality of long fiber optics, where the plurality of short fiber optics surround the plurality of long fiber optics, where the short fiber optics provide lateral support to the plurality of long fiber optics, where the plurality of short fiber optics are shorter than the plurality of long fiber optics, where the short fiber optics are the only means of lateral support for the plurality of long fiber optics, a light source, where the light source comprises an LED, where the LED emits light when powered, where the LED transfers light to the plurality of fiber optics when the LED emits light, a support portion, where the support portion is connected to the base portion, where the support portion comprises a plurality of members, where the support portion supports the fiber optic light device, and a means for power transmission, where the means for power transmission comprises an adapter and a power cord, where the adapter is connected to the fiber optic light by the power cord, where each of the plurality of fiber optics has two ends, where one end is proximate to the light source, and where the other end has a tip region that has been modified, where the modified tip region includes a portion that is wider than any other portion of the fiber optic.

14. The fiber optic light of claim 13, further comprising a top section, where the top section comprises an opening with a raised lip, where the opening with a raise lip provides an opening that supports the light portion.

15. The fiber optic light of claim 14, where the opening is circular in shape.

16. The fiber optic light of claim 13, where the plurality of fiber optics comprises a plurality of longer fiber optics, where the plurality of longer fiber optics are longer than the plurality of short fiber optics and the plurality of long fiber optics, where the plurality of longer fiber optics are laterally supported by the plurality of long fiber optics.

17. The fiber optic light of claim 13, where the light source further comprises an additional LED.

18. The fiber optic light of claim 17, where the additional LED emits a light that is a different color than the light emitted by the LED.

19. The fiber optic light of claim 13, further comprising a control circuit.

20. The fiber optic light of claim 19, where the control circuit can control the duration of the light emitted from the light source.

21. The fiber optic light of claim 18, further comprising a control circuit, where the control circuit can control the color of the light emitted from the light source.

22. The fiber optic light of claim 13, further comprising a control switch, where the control switch enables a user to turn the light source on or off.

23. The fiber optic light of claim 22, where the control switch comprises a box and a wheel device mounted substantially therein, where the user turns the light source on or off by rotating the wheel.

24. The fiber optic light of claim 22, where the control switch comprises a button, where the user turns the light source on or off by pushing the button.

25. A fiber optic light device consisting of:

a base portion, where the base portion is cylindrical in shape, a light portion, where the light portion is attached to the base portion, where the light portion comprises a plurality of fiber optics, where the plurality of fiber optics comprise a plurality of short fiber optics and a plurality of long fiber optics, where the plurality of short fiber optics surround the plurality of long fiber optics, where the short fiber optics provide lateral support to the plurality of long fiber optics, where the plurality of short fiber optics are shorter than the plurality of long fiber optics, where the short fiber optics are the only means of lateral support for the plurality of long fiber optics, a light source, where the light source comprises an LED, where the LED emits light when powered, where the LED transfers light to the plurality of fiber optics when the LED emits light, a support portion, where the support portion is connected to the base portion, where the support portion comprises a plurality of members, where the support portion supports the fiber optic light device, and a means for power transmission, where the means for power transmission comprises an adapter and a power cord, where the adapter is connected to the fiber optic light by the power cord, where each of the plurality of fiber optics has two ends, where one end is proximate to the light source, and where the other end has a tip region that has been modified, where the modified tip region comprises a groove located therein.

* * * * *